Patented Sept. 21, 1937

2,093,576

UNITED STATES PATENT OFFICE 2,093,576

SULPHONATED ESTERS OF FATTY ACIDS AND METHODS OF MAKING THE SAME

Ernest Segessemann, Newark, N. J., assignor to National Oil Products Company, Harrison, N. J., a corporation of New Jersey No Drawing. Application September 25, 1934, Serial No. 745,450

22 Claims. (Cl. 260—106)

My invention relates to the sulphonation of derivatives of organic compounds and fatty acids and the production of sulphonated derivatives therefrom in a novel and advantageous manner.

Fatty acids and their derivatives have heretofore been sulphonated by treating them with a suitable sulphonating agent under the proper conditions of time and temperature, effecting the addition of acid sulphate groups ($SO_4H$) with a sulphur-oxygen-carbon linkage at the double bond in the fatty acid chain, as in the case of oleic acid, or by substitution of a hydrogen atom of a hydroxyl group at the fatty acid chain, as in the case of ricinoleic acid. It is also known that true sulphonic acid groups ($SO_3H$) with a sulphur to carbon linkage have been introduced into the fatty acid chain by the use of highly concentrated sulphonating agents or by the use of high temperatures, or by the use of acetyl sulphuric acid or ethionic acid.

All these processes, while useful, show certain disadvantages, namely they can only be applied to such fatty acids or their derivatives which are either unsaturated or which contain hydroxyl groups in the molecule. It has heretofore not been possible to sulphonate saturated fatty acids or their derivatives to a satisfactory degree. Furthermore, the sulphonated compounds with acid sulphate groups are subject to ready hydrolysis in acid mediums, the products made with highly concentrated sulphonating agents and those made at high temperatures are of dark color, and the processes involving acetyl sulphuric acid or ethionic acid are comparatively expensive.

According to the present invention, esters are prepared after a known method from mono- or poly-carboxylic fatty acids and such primary or secondary alcohols or commercial mixtures of alcohols which contain a tertiary carbon atom in their molecule; such as iso-propyl carbinol, iso-butyl carbinol, fusel oils, etc.; a tertiary carbon atom being understood as a carbon atom directly linked to three other carbon atoms.

I have found that if these esters, and other hydrocarbons having a tertiary carbon atom, are treated with a suitable sulphonating agent, under the proper conditions of time and temperature, a true sulphonic acid group with sulphur to carbon linkage is introduced at the tertiary carbon atom of the alcohol radical, involving the substitution of the hydrogen atom, according to the reaction

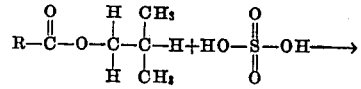

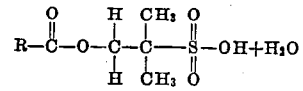

in which

is the saturated or unsaturated fatty acid radical.

If the fatty acid radical is unsaturated a sulphate group may be introduced in addition at the double bond of the acid chain.

This invention makes it possible to sulphonate and make water soluble the esters of saturated fatty acids such as stearic, lauric, or palmitic acid etc., by introducing a sulphonic group at the alcohol radical of the ester. In the case of esters of unsaturated fatty acids of the type as described above it is possible to obtain an unusually high degree of sulphonation by introduction of a sulphonic acid group at the tertiary carbon atom of the alcohol radical and by additional introduction of a sulphate group at the double bond of the acid radical.

The products obtained according to the procedures of this invention exhibit good solubility in water, they are resistant to hard water, they are of light color and comparatively inexpensive.

Among the esters suitable for the production of the sulphonated products of my invention are the esters of aliphatic alcohols having one or more tertiary carbon atoms with mono- or poly-carboxylic acids, and the acids may be saturated or unsaturated, aliphatic, cyclic, heterocyclic or benzenoid, such as stearic acid, palmitic acid, lauric acid, oleic acid, erucic acid, brassidic acid, sebacic acid, suberic acid, heptadecane-dicarboxylic acid, salicylic acid, benzoic acid, naphthalene-beta-carboxylic acid, cyclohexanoic acid, cyclopentanoic acid, cyclo-octanoic acid, furoic acid, thiophene-alpha-carboxylic acid and proline.

I give the following as examples of my process for the production of the indicated compounds:—

Example one

One mol. of stearic acid is esterified with one mol. of isobutyl carbinol by heating the mixture under reflux at 120° to 170° C. with 2% phosphoric acid as catalyst, and eliminating the water of reaction as soon as formed by the use of a water trap. 100 parts by weight of this ester are sulphonated with 50 parts of 94% sulphuric acid for two hours keeping the temperature at 25° C. The reaction mass is washed and neutralized in the usual manner.

Example two

One mol. of olive oil is esterified with three mols of isopropyl carbinol by heating under reflux at the boiling point of the alcohol with 2% of sulphuric acid as catalyst for 4 hours. After the reaction is complete the glycerine is separated by mechanical means. 100 parts of this ester are sulphonated with 30 parts of 100% sulphuric acid for two hours, keeping the temperature at 10° C. The reaction product is then washed and neutralized.

Example three 100 parts of the ester of sebacic acid and isobutyl carbinol are sulphonated with 30 parts of 100% sulphuric acid at 10° C. for two hours. The reaction mass is neutralized and washed in the usual manner. The resulting product is useful as a penetrant, wetting-out agent and dyeing assistant in various textile operations.

Example four 100 parts of the ester of beta ethyl hexanol and salicylic acid are sulphonated with 100 parts of 100% sulphuric acid at 30° C. for two hours. The reaction mass is neutralized and washed in the usual manner. The product is useful as a dyeing assistant and to produce a certain finish on textile fabrics.

Example five 100 parts of 100% sulphuric acid mentioned in Example 4 may be replaced by 50 parts of chlorosulphonic acid.

The products prepared in accordance with the procedures of this invention may be used in the industries wherever sulphonated oils are employed, especially in the textile industry as detergents, wetting agents, dispersing agents, dyeing assistants, penetrants, softening agents and finishing compounds; in the leather industry as penetrating agents, carrying agents for fats and other hydrocarbons, emulsifying agents and fat liquors; in the glue and paper industries as defoaming agents; in the petroleum industry for breaking petroleum emulsions and in other industries.

I do not limit myself to the particular compounds, times, temperatures, quantities, or steps of procedure specifically mentioned, as these are given simply to clearly explain my invention.

What I claim is:—

1. A process for the production of sulphonated compounds which comprises treating the ester of a member of the group consisting of mono-carboxylic and poly-carboxylic acids of members of the saturated aliphatic, unsaturated aliphatic, cyclic, heterocyclic and benzenoid series and an aliphatic alcohol having one or more tertiary carbon atoms of the type linked to three other carbon atoms with a sulphonating agent, said treatment being continued until the tertiary carbon atom in the alcohol radical is sulphonated.

2. A process for the production of sulphonated compounds which comprises sulphonating the ester of a member of the group consisting of mono-carboxylic and poly-carboxylic acids of members of the saturated aliphatic, unsaturated aliphatic, cyclic, heterocyclic and benzenoid series, and an aliphatic alcohol having one or more tertiary carbon atoms of the type linked to three other carbon atoms with sulphuric acid, said treatment being continued until the tertiary carbon atom in the alcohol radical is sulphonated.

3. A process for the production of sulphonated compounds which comprises treating an ester of stearic acid and an aliphatic alcohol having one or more tertiary carbon atoms of the type linked to three other carbon atoms with a sulphonating agent.

4. A process for the production of sulphonated compounds which comprises sulphonating an ester of stearic acid and an aliphatic alcohol having one or more tertiary carbon atoms of the type linked to three other carbon atoms with sulphuric acid.

5. A process for the production of sulphonated compounds which comprises treating the ester of a member of the group consisting of mono-carboxylic and poly-carboxylic acids of members of the saturated aliphatic, unsaturated aliphatic, cyclic, heterocyclic and benzenoid series and iso-butyl-carbinol with a sulphonating agent, said treatment being continued until the tertiary carbon atom in the alcohol radical is sulphonated.

6. A process for the production of sulphonated compounds which comprises sulphonating the ester of a member of the group consisting of mono-carboxylic and poly-carboxylic acids of members of the saturated aliphatic, unsaturated aliphatic, cyclic, heterocyclic and benzenoid series and iso-butyl-carbinol with sulphuric acid, said treatment being continued until the tertiary carbon atom in the alcohol radical is sulphonated.

7. A process for the production of a sulphonated compound which comprises treating the ester of stearic acid and iso-butyl-carbinol with a sulphonating agent.

8. A process for the production of a sulphonated compound which comprises sulphonating the ester of stearic acid and iso-butyl-carbinol with sulphuric acid.

9. As a new compound, an ester of a carboxylic acid with an aliphatic alcohol having tertiary carbon atoms linked to three other carbon atoms, in which at least one tertiary carbon atom of the alcohol radical is combined with a sulpho group.

10. As a new compound, an ester of an unsaturated fatty acid with an aliphatic alcohol having tertiary carbon atoms linked to three other carbon atoms, in which at least one tertiary carbon atom of the alcohol radical is combined with a sulpho group.

11. As new compounds, the products produced according to claim 1.

12. As new compounds, the products produced according to claim 2.

13. As new compounds, the products produced according to claim 3.

14. As new compounds, the products produced according to claim 4.

15. As new compounds, the products produced according to claim 5.

16. As new compounds, the products produced according to claim 6.

17. As a new compound, the product produced according to claim 7.

18. As a new compound, the product produced according to claim 8.

19. A process for the production of sulphonated compounds, which comprises introducing a sulphonic acid group in the tertiary carbon of the alcohol radical by treating the ester of a saturated fatty acid and an aliphatic alcohol having one or more tertiary carbon atoms of the type linked to three other carbon atoms with a sulphonating agent.

20. A process for the production of sulphonated compounds, which comprises introducing a sulphonic acid group in the tertiary carbon of the alcohol radical by sulphonating the ester of a saturated fatty acid and an aliphatic alcohol having one or more tertiary carbon atoms of the type linked to three other carbon atoms with sulphuric acid.

21. As new compounds, the products produced according to claim 19.

22. As new compounds, the products produced according to claim 20.

ERNEST SEGESSEMANN.